Patented Feb. 18, 1936

2,031,401

UNITED STATES PATENT OFFICE 2,031,401

APPARATUS FOR SEVERING BIAS CUT FABRIC

Harry Willshaw, Wylde Green, and Harold Smith and Frank Arthur Davenport, Birmingham, England, assignors to Dunlop Tire and Rubber Corporation, Buffalo, N. Y., a corporation of New York Application July 9, 1935, Serial No. 30,504
In Great Britain May 10, 1934

5 Claims. (Cl. 242—59)

Our invention relates to apparatus for separating a sheet of fabric and rubber material into bias cut strips to be used as plies in the manufacture of pneumatic tires. Prior to separating the fabric and rubber material into ply strips it is partially cut or incised on bias lines into a continuous sheet of lightly adhering bias cut strips. These strips are mechanically separated or severed by tearing them successively from the continuous sheet.

Our invention provides an improved means whereby successive plies are separated from the partly cut or severed sheet and are placed and carried in spaced position on a lining.

The various features of the invention are illustrated in the accompanying drawing, in which—

Figure 1:
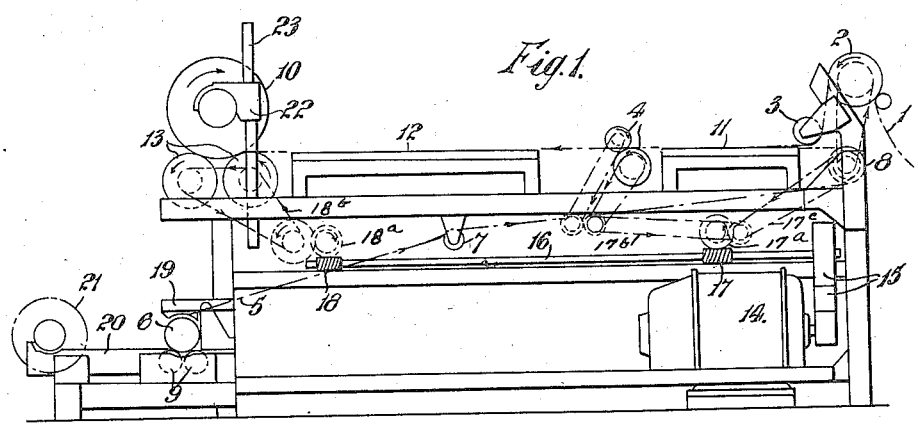
Fig. 1 is a side view.
Figure 2:
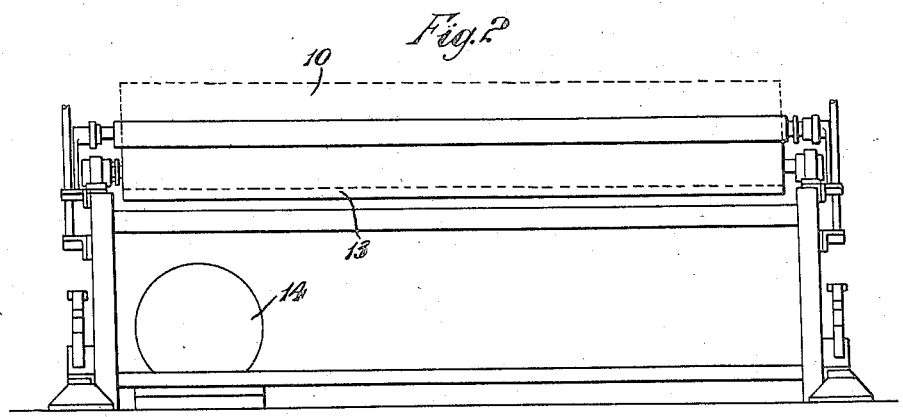
Fig. 2 is an end view of apparatus embodying a preferred form of the invention.

In our invention the bias severed, or partly severed material, is fed through a severing space to surfaces moving at a more rapid speed whereby successive strips are torn from the sheet of material and separated from the succeeding sheet. Lining material, that is sheet material used between tacky surfaces of elements that are to be made into tires to prevent them from sticking together, is fed from a supporting roll, called an "empty roll", to the more rapidly moving surface so as to receive and support the severed plies as they are separated from the ply sheet. The lining sheet then carries the severed plies to a roll, called a "full roll", on which the plies and lining material are wound, so that the plies are separated from each other by an intervening layer of lining material. The reeling of the lining material from the empty roll and its rolling up or batching up on the full roll are preferably driven from the driving means of the severing elements or in synchronism therewith.

Refering more particularly to the accompanying drawing, a continuous sheet 1 of lightly adhering strips formed by incising or partly cutting the fabric of unvulcanized rubber is fed over a feed roller 2 and under the guide roller 3 to and between a number of tearing rolls 4 which are driven at a faster peripheral speed than the supply roll 2. Inasmuch as the speed of the material entering between the rolls 4 is increased, successive strips or plies are torn from the supply sheet at the incised or partly severed line. These plies are received on a continuous sheet 5 of lining material which is supplied below the severed strips as they enter between the rolls 4. The strip 5 of lining material is drawn from an empty roll 6 over a guide roller 7, thence about a feed roller 8, from whence it is drawn below the sheet 1 to the rolls 4. It then passes between the rolls 4 with the severed plies. The empty roll 6 is supported on anti-friction rolls 9 so that it may be readily rotated as material is withdrawn from it. After passing the rolls 4, the lining is wound onto a full roll or filling roll 10 together with the severed strips or plies that have been placed in successive spaced position on it.

The lining material is drawn forwardly at the same peripheral speed as the rolls 4, and in the area 11 immediately in advance of the rolls 4 the plies separated from the incised material fall in successive spaced positions on to the lining. After passing through the rolls 4, the severed strips are carried through the area 12 by the lining material which acts as a conveyor.

The filling or full roll 10 is supported peripherally by a pair of supporting and driving rolls 13 which are driven from a motor 14 which also drives the severing rolls 4 and the supply roll 2 at appropriate speeds. For this purpose power is supplied from the motor 14 through gears 15 to a main drive shaft 16. From the shaft 16 the severing rolls 4 and the feed rolls 2 are driven by means of a worm 17 which meshes with a gear 17a which, in turn, drives the severing rolls 4 through driving belts 17b and drives the feed roll 2 through a driving belt 17c. It will be understood that the speed reduction means in the belts 17b and 17c are so proportioned to the diameters of the rolls 2 and 4 as to impart a slower peripheral speed to the supply roll 2 than to the severing rolls 4. A second worm 18 on the shaft 16 meshes with a gear 18a which drives the supporting rolls 13 through belting 18b so that the peripheral speed of the rolls 13 is approximately the same as that of the severing rolls 4.

The empty roll 6 is rotated by the tension or pull of the lining material 5. To prevent it from over-running and lifting off the rolls 9, a stop 19 is provided. A runway 20 supports a second empty roll so that when the empty roll 6 becomes entirely empty, the second roll 21 may be promptly rolled into position, and lining material continuously withdrawn from it. To prevent over-running of the full roll 10, a bracket 22 slidably mounted on a vertical support 23 is provided to engage the full roll.

From the above it will be apparent that the motor 14 will rotate the driving rolls 13, the severing roll 4 and the feed roll 8 at equal speeds and thereby draw the lining material 5 from the empty roll 6 about the drive roll 8 and through the areas 11 and 12 to be wound on the full roll. Simultaneously, the supply roll 2 will supply incised material to the area 11 from whence it will be engaged by the severing rolls 4 to carry the successive plies, which have been carried by the lining, through the area 12 to be wound up or batched up on the roll 10.

When the plies are to be used in the making of a tire, the full roll 10 after being removed from the apparatus and replaced by another roll to be filled, is unreeled and the plies removed as needed. The invention provides a means whereby the tacky material is automatically severed and batched into plies economically spaced in the lining material.

What we claim is—

1. Apparatus for separating bias cut fabric into successive bias plies which comprises a feed roll, a pair of fabric engaging rolls in advance of said feed roll, means for rotatably supporting a supply roll of lining material, means for guiding said lining material from said supply roll below said bias cut fabric through said engaging rolls, means for reeling said lining material after passing through said engaging rolls, and means for driving said reeling means and said engaging rolls at a greater surface speed than said bias material feeding means.

2. Apparatus for separating and batching up bias plies which comprises a roller feed means for supplying bias cut material, a pair of engaging rolls to receive said bias cut material, a lining supply roll, a guide roll for lining material from said supply roll below said fabric feed roll, a batching up reel positioned to draw lining from said guide roll through said engaging rolls to receive plies torn from said fabric, and means to drive said batching up reel and said engaging rolls at a greater surface speed than the supply of bias cut fabric.

3. Apparatus for separating and batching up bias plies which comprises a roller feed means for supplying bias cut material, a pair of engaging rolls to receive said bias cut material, a lining supply roll, a guide roll for lining material from said supply roll below said fabric feed roll, a batching up reel positioned to draw lining from said guide roll through said engaging rolls to receive plies torn from said fabric, means to drive said batching up reel and said engaging rolls at a greater surface speed than the supply of bias cut fabric, said means comprising a common motor, a worm drive for said engaging rolls and said supply means, and a second worm drive for said batching up reel.

4. Apparatus for separating bias cut material into bias plies which comprises an engaging surface for engaging and drawing forward a lining and bias cut material superposed on said lining, means for feeding the bias cut material at a less rapid speed than that of said engaging surface whereby said material is drawn apart into plies, and means for feeding said lining fabric to said engaging surface below said bias cut material at the same speed as that of said engaging surface.

5. Apparatus for separating bias cut material into bias plies which comprises an engaging surface for engaging and drawing a lining material and bias cut material superposed thereon, means for feeding said bias cut material to said engaging surface at a slower speed than the speed of said engaging surface whereby said bias cut material is drawn apart into plies, means for feeding lining fabric to said engaging surface below said bias cut material at the speed of said engaging surface, means to receive and roll up the fabric lining and bias cut plies after passing said engaging surface, and a common driving means for said surface, said rolling up means, said feeding means and said lining.

HARRY WILLSHAW.
HAROLD SMITH.
FRANK ARTHUR DAVENPORT.